(No Model.)
J. J. POWERS.
AUTOMATIC PLUG FEEDER OR PLUG COCK.
No. 424,688. Patented Apr. 1, 1890.
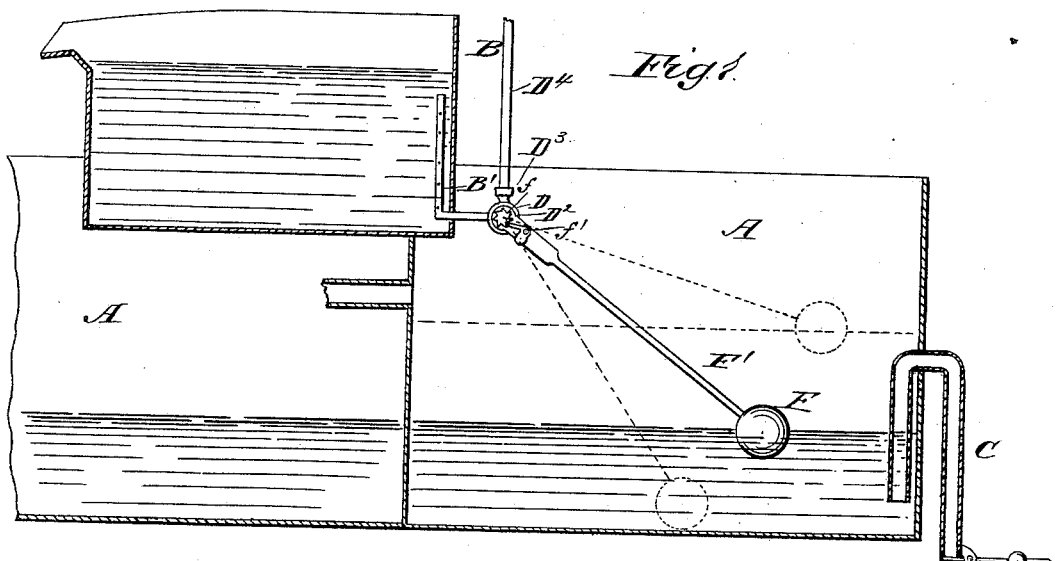
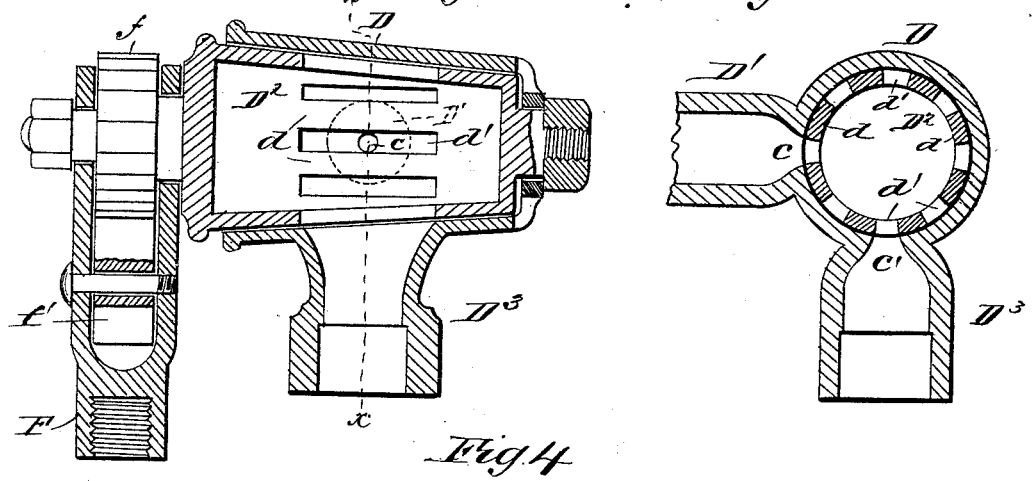
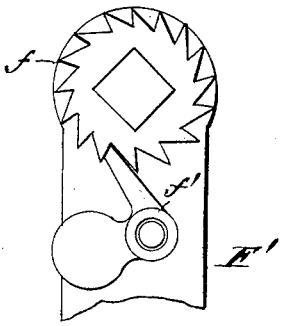
WITNESSES:
INVENTOR:
J. J. Powers
BY
Munn & Co.
ATTORNEYS

UNITED STATES PATENT OFFICE.

JAMES J. POWERS, OF BROOKLYN, NEW YORK.

AUTOMATIC PLUG-FEEDER OR PLUG-COCK.

SPECIFICATION forming part of Letters Patent No. 424,688, dated April 1, 1890.

Application filed October 23, 1889. Serial No. 327,897. (No model.)

*To all whom it may concern:*

Be it known that I, JAMES J. POWERS, of Brooklyn, in the county of Kings and State of New York, have invented a new and Improved Automatic Plug-Feeder or Plug-Cock, of which the following is a full, clear, and exact description.

My present invention relates to certain improvements in Letters Patent granted to me August 6, 1889, No. 408,431—that is, to a float ratchet-feeder or plug-cock designed more particularly to be used in feeding chemical disinfectants to sewage-vats, but may be used in other situations, and it may be used to intermittently admit water or other substance to a tank containing the chemical, as illustrated in the annexed drawings; or it may be applied in any other appropriate manner.

Reference is to be had to the accompanying drawings, forming a part of this specification, in which similar letters of reference indicate corresponding parts in all the figures.

Figure 1 shows one application of my invention, whereby liquid is intermittently and automatically admitted from an elevated tank to a lower tank. Fig. 2 is an enlarged sectional view of the ratchet-cock. Fig. 3 is a sectional elevation of the same on line $x\,x$ of Fig. 2; and Fig. 4 is a detail view of the pawl, ratchet, and float-lever.

A is a tank or vat, to which sewage is admitted, and B is an elevated tank containing a supply of liquid disinfectant. In the tank A is fitted a siphon C, which draws off the contents of the vat A at intervals in a well-known manner. From tank B leads a pipe B', which terminates in a coupling D' of the plug-cock casing D. In the said casing is fitted the hollow plug $D^2$, formed with several solid portions $d\,d$ and intermediate slots $d'\,d'$. Opposite the coupling D' is a port $D^3$. The entrance $c$ and outlet $c'$ of the cock are arranged relatively to the solid parts $d$ and slots $d'$ of the plug, so that as the plug is revolved it will simultaneously open or close the said ports—that is, when port $c$ is opened port $c'$ will also be opened, and vice versa. To port $D^3$ is attached a pipe $D^4$, leading to an elevated head or other supply to force water into the tank B when the cock is opened.

The plug is intermittently revolved by the rise and fall of the liquid in the vat A, so that the discharge of liquid from tank B into vat A is automatic and intermittent. This is effected by the float F on lever F', the ratchet $f$ on the end of the plug $D^2$, and the pawl $f'$, pivoted to the lever F' to engage with the teeth of the ratchet.

The operation is as follows: When the float F reaches its lowermost position by the drawing off of the contents of vat A by the action of the siphon, the solid portions of the plug $D^2$ will close the openings $c\,c'$ of the plug-cock, or one of them. As the liquid rises in the vat A, the float, its lever, and the pawl $f'$ will be lifted without communicating any movement to the plug $D^2$. When the siphon starts, the descent of the float opens the cock and admits a flow of liquid to tank B, which overflows into vat A. In this instance the ports are so arranged that the cock remains open while the float is falling one-half the distance, and then closes the cock while it falls the remainder of the distance, so that the cock is closed when the float is at the top, and also when it is at the bottom, of the tank. The ratchet and pawl allow the float to rise without opening the cock, and the plug $D^2$ must have a plurality of slots $d'$.

Having thus described my invention, what I claim as new, and desire to secure by Letters Patent, is—

1. The combination, with a vat in which liquid is permitted to rise and fall and an elevated tank, of a cock provided with a rotating plug fitted in a pipe leading into the tank, and a float-lever applied to the cock for turning the plug as the float-lever descends, substantially as described.

2. The vat A, in which liquid is permitted to rise and fall, and the tank B and pipe B', in combination with a plug-cock, a ratchet applied thereto, and a float-lever provided with a pawl adapted to engage with the ratchet, substantially as described.

JAMES J. POWERS.

Witnesses:
H. A. WEST,
C. SEDGWICK.